O. D. BARTOW.
HOBBY HORSE.
APPLICATION FILED SEPT. 23, 1911.

1,042,308.

Patented Oct. 22, 1912.
2 SHEETS—SHEET 1.

Witnesses:
Christ Feinle, Jr.
John A. Dinizay

Inventor,
Orville D. Bartow.
By Victor J. Evans,
Attorney.

COLUMBIA PLANOGRAPH CO., WASHINGTON, D. C.

O. D. BARTOW.
HOBBY HORSE.
APPLICATION FILED SEPT. 23, 1911.

1,042,308.

Patented Oct. 22, 1912.
2 SHEETS—SHEET 2.

Witnesses:
Christ Feinle, Jr.,
John A. Donogh

Inventor,
Orville D. Bartow.
By Victor J. Evans,
Attorney.

UNITED STATES PATENT OFFICE.

ORVILLE D. BARTOW, OF PHILADELPHIA, PENNSYLVANIA.

HOBBY-HORSE.

1,042,308. Specification of Letters Patent. Patented Oct. 22, 1912.

Application filed September 23, 1911. Serial No. 650,871.

*To all whom it may concern:*

Be it known that I, ORVILLE D. BARTOW, a citizen of the United States, residing at Philadelphia, in the county of Philadelphia and State of Pennsylvania, have invented new and useful Improvements in Hobby-Horses, of which the following is a specification.

The general object of the invention is to enable the operator of a toy, such as a hobby-horse, to propel the same over a floor synchronously with the rocking of the horse.

Figure 1:
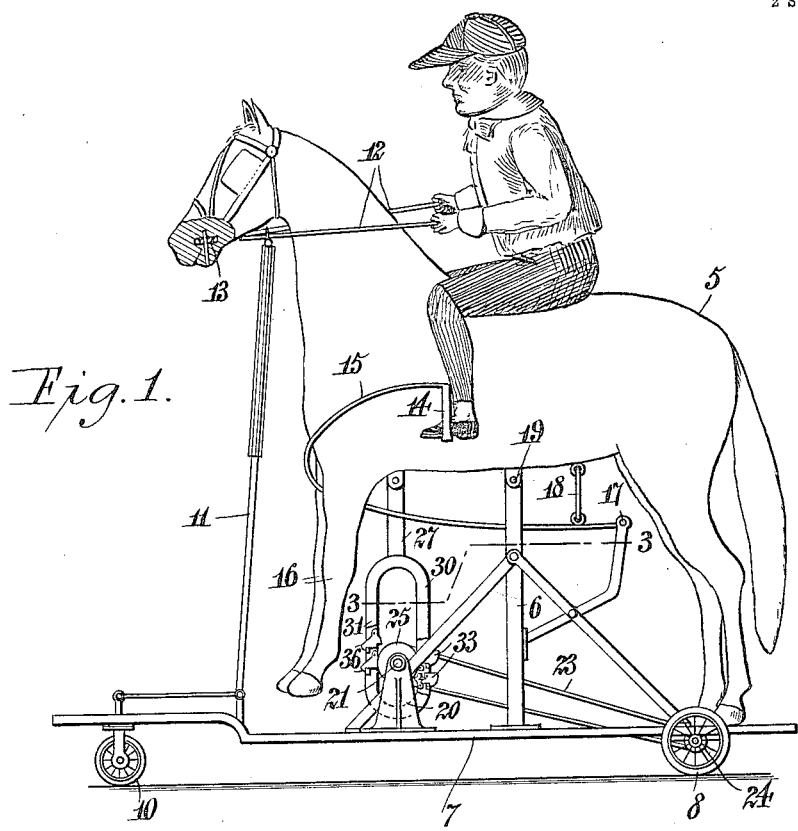
Figure 4:
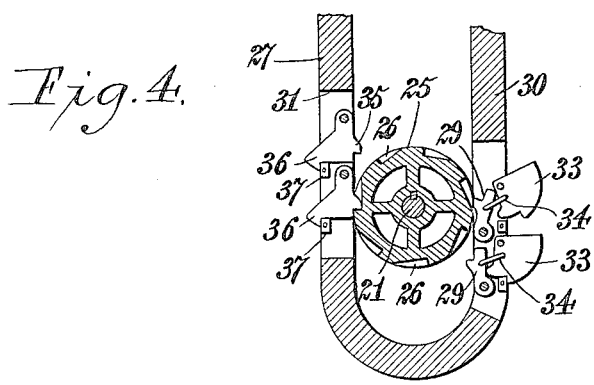
Figure 2:
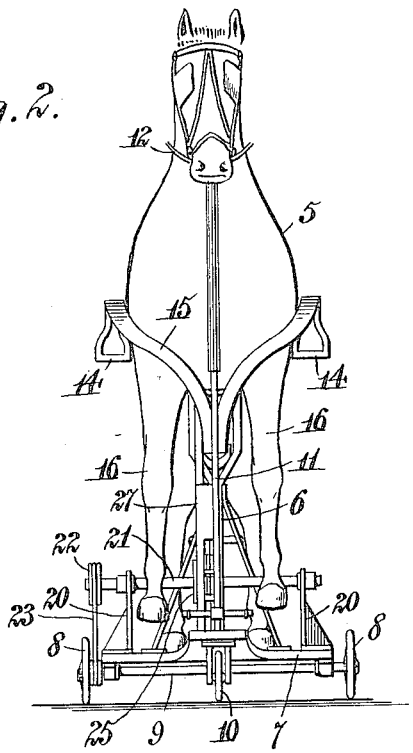
Figure 3:
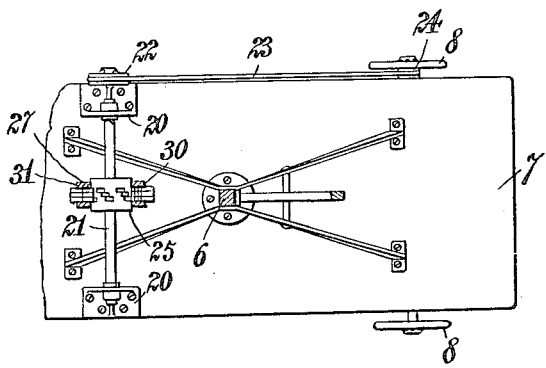

Other objects will appear and be better understood from the following description taken in connection with the accompanying drawings, in which, Figure 1 is a side elevation of the device partly in section. Fig. 2 is a front elevation. Fig. 3 is a detail sectional plan on the line 3—3 of Fig. 1. Fig. 4 is an enlarged detail vertical section taken through the rack bars and drum.

5 indicates the figure which supports the operator. This figure may be of any desired shape or contour so as to represent a horse as shown in the drawings, but may be of other fanciful design to represent a boat, vehicle or the like. The figure 5 is adapted to rock on an upright 6 carried by a platform 7 having traction wheels 8 connected by a shaft 9 arranged at one end portion of the platform. The opposite end of the platform being provided with a suitable steering device, such as a caster 10 which may be turned through any desired instrumentality controlled by the operator seated on the figure 5, a convenient structure for performing this result being shown in the drawings and comprising a T-shaped rod 11 turned by the reins 12 which pass over a pulley 13 arranged in the mouth of the figure 5, said rod 11 being connected in any preferred manner to the caster wheel, such as that shown in the drawings.

The traction force for rocking the horse is supplied by the operator who presses with his feet on the stirrups 14 at the opposite ends of a forked lever 15 which straddles the neck of the animal and extends between the fore legs 16 and fulcrumed as at 17 on one end of a bracket which extends to a point adjacent to the hind legs of the animal, a suitable link connection such as that shown at 18, being established between the lever and the body of the animal. With this construction it will be understood, of course, that when the animal is horizontal the extremities of the legs thereof will be in spaced relation to the platform 7. As the figure 5 is rocked or oscillated on its pivot 19 as just described it is intended to propel the platform with the figure thereon, and operator in either direction. A convenient means for producing this result is shown in the drawings, wherein suitable traction gearing in which the figure is included is connected to the shaft or axle 9. In this connection 20, 20 indicate brackets arranged in spaced relation with the support and 21 a shaft journaled in boxings carried by these brackets and provided with a fast pulley 22 connected in any suitable manner such as by a belt 23, with a pulley 24 on the shaft or axle 9.

25 indicates a drum fast on the shaft 21 and having ratchet teeth formed by suitable depressions 26 in its periphery, and 27 indicates an internal rack having movable teeth 29 adapted to interlock with the teeth 26 of the drum so that when the rack is reciprocated by the figure 5 to which it is connected, the drum will be rotated and through the belt and pulley connection just described the shaft 9 with the wheels 8 thereon, will be rotated, whereby, the result previously mentioned will be attained.

In the drawings I have shown a peculiarly constructed internal rack the sides of which are shown in detail in Fig. 4 and designated by the numerals 30 and 31. The teeth 29 on the side 30 are pivoted as at 32, in a longitudinal recess with which the said side 30 is provided. These teeth are adapted to yield inwardly when the rack bar moves downwardly and during their inward or yielding movement they lift pivoted weights 33 to which they are connected by links 34. During the upward movement of the rack bar, however, the teeth, as they successively engage with the teeth 26 of the drum will no longer yield to remain in their projected positions under the action of the weights 33, whereby, to impart turning movement to the drum as the upward movement of the rack continues. The teeth 35 on the side 31 are pivoted in a longitudinal recess with which the said side 31 is provided. These teeth are overbalanced so that their engaging ends will normally project beyond the inner edge of the side 31 and each tooth has a projection 36 to abut a stop 37, whereby, to limit the inward movement of its engaging end, but in no wise to hinder outward movement of the said engaging end. The engaging ends are arranged so as to override the teeth 26 as the rack moves upwardly, but any of the engaging ends are adapted to interlock with one of the teeth 26 when the rack bar moves downwardly. Thus it will be seen that at each stroke of the rack bar an impelling force will be given to the drum 25, thus preventing lost motion and insuring comparatively rapid progress. With this arrangement, and inasmuch as the employment of cranks and connecting rods are eliminated, it will be impossible for the device to get on a dead center.

Although I have shown and described one embodiment of my invention it is to be understood that I am not to be limited to the specific arrangement and construction of parts since various changes will be made, within the scope of the appended claims without departing from the spirit or sacrificing any of the advantages of the invention.

What I claim as new is:

1. In a traction toy, the combination of a support provided with traction wheels, a figure pivotally mounted on the support, traction gearing for turning the wheels and including a vertically disposed element pivotally connected to the figure, and operating means connected to the support and to the figure and operable by an operator on the figure for the purpose set forth.

2. In a traction toy, the combination of a support provided with traction wheels, a figure pivotally mounted on the support, traction gearing for turning the wheels and including a vertically disposed element pivotally connected to the figure, and operating means connected to the support and pivotally connected to the figure and operable by the feet of an operator on the figure, for the purpose set forth.

3. In a traction toy, the combination of a support provided with traction wheels, a figure for holding an operator and pivotally mounted on the support, traction gearing for turning the traction wheels and operable by the feet of the operator and including a ratchet wheel rotatably mounted on the support and an element connected to the figure and having a series of pawls adapted for engaging the ratchet wheel.

4. In a traction toy, the combination of a support provided with traction wheels, a figure for holding an operator and pivotally mounted on the support, traction gearing for turning the traction wheels and operable by the feet of the operator and including a ratchet wheel rotatably mounted on the support, and an element pivotally connected to the figure and recessed to receive the ratchet wheel and provided with oppositely disposed pawls for alternately engaging with the ratchet wheel.

In testimony whereof I affix my signature in presence of two witnesses.

ORVILLE D. BARTOW.

Witnesses:
 Louis M. Fridenberg,
 Norman J. Smith.

---

Copies of this patent may be obtained for five cents each, by addressing the "Commissioner of Patents, Washington, D. C."